United States Patent [19]

Kojima et al.

[11] Patent Number: 4,711,926

[45] Date of Patent: Dec. 8, 1987

[54] COMPOSITION FOR ELECTRODEPOSITION PAINT

[75] Inventors: Masaki Kojima, Himeji; Seiji Munekata, Tokyo, both of Japan

[73] Assignees: Honny Chemicals Company Ltd., Kobe; Asahi Glass Company Ltd., Tokyo, both of Japan

[21] Appl. No.: 903,951

[22] Filed: Sep. 5, 1986

[30] Foreign Application Priority Data

Sep. 9, 1985 [JP] Japan .................................. 60-197610

[51] Int. Cl.$^4$ ............................................... C08L 61/00
[52] U.S. Cl. ..................................... 524/512; 524/901; 525/162; 525/163
[58] Field of Search ............ 525/162, 163, 386, 326.2; 524/512, 901

[56] References Cited

U.S. PATENT DOCUMENTS 3,965,058  6/1976  Yurcheshen .................... 524/901 X
4,487,893  12/1984  Yamabe et al. ..................... 525/386

FOREIGN PATENT DOCUMENTS 0050447  4/1982  European Pat. Off. .

Primary Examiner—Theodore E. Pertilla
Attorney, Agent, or Firm—Oblon, Fisher, Spivak, McClelland & Maier

[57] ABSTRACT

A composition for electrodeposition paint, comprising (a) a water-dispersible and electrophoretic fluoropolymer obtained by neutralizing with a basic compound at least a part of carboxyl groups of a carboxyl and hydroxyl group-containing fluoropolymer having an acid value of from 5 to 30 and a OH value of from 30 to 150 and (b) an aminoplast, which are dispersed in an aqueous medium in a weight ratio of component (a)/component (b) of from 50/50 to 97/3.

3 Claims, No Drawings

COMPOSITION FOR ELECTRODEPOSITION PAINT

The present invention relates to a composition for electrodeposition paint. More particularly, it relates to a composition for electrodeposition paint which comprises a water-dispersible and electrophoretic fluoropolymer and an aminoplast as film-forming components.

Conventional compositions commonly employed for electrodeposition paints are usually prepared by neutralizing at least a part of carboxyl groups of a polycarboxylic acid resin with a basic compound and dispersing or dissolving the neutralized resin in an aqueous medium.

Generally, stability is regarded as one of the conditions essential to an electrodeposition paint. In an electrodeposition paint, the solid content at the time of the application is low (from 5 to 20% by weight), and as distinguished from paints for other methods such as a spray method and a brushing method, the electrodeposition paint is not of a throwaway type, and is required to maintain the low concentration state for a long period of time. Accordingly, it is required to have stability in a dilute water solution, stability against hydrolysis during storage and stability against oxidative degradation.

Further, the application is conducted by an electric energy to deposit the film-forming components on the substrate to be coated. Accordingly, special properties such as the throwing power, coulomb yield, electric resistance of the electrodeposited film, etc. are required for the application, which are not required in other coating methods.

Further, the composition of the electrodeposition paint bath changes during a continuous electrodeposition process, and as a result, the surface condition of the coated film, the physical and chemical conditions of the coated film or the characteristic phenomena in the electrodeposition, undergo changes, and therefore the paint is desired to have minimum requirements from the quality control aspect. Various studies have been made on electrodeposition paints to meet such various conditions. In the conventional electrodeposition paints, it has been common to employ a polycarboxylic acid resin having a high acid value of a level of from about 30 to about 300 as a film-forming component. However, if a polycarboxylic acid resin having such a high acid value is employed, the coulomb yield tends to be small, the consumption of an electric energy increases accordingly, and in some cases, a substantial amount of oxygen is generated at the anode, which causes defects such as pinholes in the film. Furthermore, the coating film contains a substantial amount of carboxyl groups and thus is inferior in the chemical resistance, particularly in such properties as the alkali resistance, boiling water resistance, salt resistance or the like.

An attention may then be drawn to a polycarboxylic acid resin having a low acid value. However, such a resin is hardly soluble in water, and the electrodeposition paint will be inferior in the stability and tends to undergo separation with white turbidity. Because of these serious drawbacks, it has been difficult to use such a resin for practical application.

On the other hand, a fluoropolymer is known to form a coating film having excellent weather resistance, and to have other excellent properties such as the solvent resistance, stain resistance, surface hardness and gloss retention.

For the electrodeposition coating of a fluoropolymer, there have been known (1) a method wherein a powder of polyvinylidene fluoride or polyvinyl fluoride is dispersed in a mixed medium comprising an organic liquid and water capable of providing a film-forming function to the polymer at a temperature lower than the melting point of the polymer, then, a water soluble resin capable of dissociating in water is added to the dispersion, and a direct current is applied in the dispersion between an anode being the substrate to be coated and a cathode to form an electrodeposited film on the surface of the substrate (Japanese Examined Patent Publication No. 28656/1974) and (2) a method wherein an electrodeposition coating is applied to a substrate to be coated by using a dispersion obtained by emulsion-polymerizing one or more vinyl-type monomers in an aqueous dispersion of a fluorinated polymer, and then, the electrodeposited substrate thus obtained is subjected to dipping treatment in a hydrophilic aqueous solvent for a short period of time, followed by baking to form a continuous coating film (Japanese Examined Patent Publication No. 2099/1976).

However, the fluoropolymers used in these electrodeposition coating methods are not of the type wherein the polymers themselves electrophoretically deposit on the substrates to be coated to form coating films, but of the type wherein another hydrophilic resin capable of undergoing electrophoresis is also present, or an electrophoretic resin is coated on the surface of fluoropolymer particles. Accordingly, it is difficult to form an electrodeposited film of the fluoropolymer uniformly, whereby various excellent properties of the fluoropolymer are not adequately obtainable, and the adhesion of the film to the substrate is inferior.

It is an object of the present invention to provide a composition for electrodeposition paint comprising an electrophoretic fluoropolymer as a major component for the formation of a coating film, which is readily soluble or dispersible even with a low acid value.

The present invention provides a composition for electrodeposition paint, comprising (a) a water-dispersible and electrophoretic fluoropolymer obtained by neutralizing with a basic compound at least a part of carboxyl groups of a carboxyl and hydroxyl group-containing fluoropolymer having an acid value of from 50 to 30 and a OH value of from 30 to 150 and (b) an aminoplast, which are dispersed in an aqueous medium in a weight ratio of component (a)/component (b) of from 50/50 to 97/3.

Now, the present invention will be described in detail with reference to the preferred embodiments.

As the carboxyl and hydroxyl group-containing fluoropolymer to be used in the present invention, there may be mentioned the one with the carboxyl groups introduced by reacting a dibasic acid anhydride to a hydroxyl group-containing fluoropolymer. (Japanese Unexamined Patent Publication No. 136605/1983).

As distinguished from usual polycarboxylic acid resins, this fluoropolymer has a characteristic such that it is readily dispersible and stable in water in a low acid value range. In the present invention, a fluoropolymer having an acid value within a range of from 5 to 30 is used as the film-forming component.

If the acid value is less than 5, the polymer will not adequately be dispersed in water, and if dispersed, the dispersion tends to be unstable. On the other hand, if the acid value exceeds 30, the film condition tends to deteriorate, and the outer appearance of the electrodeposited coating film tends to be poor, such being undesirable.

The fluoropolymer to be employed has a OH value within a range of from 30 to 150. If the OH value is less than 30, no adequate crosslinking reaction with the aminoplast will be obtained, whereby the coating properties tend to be inferior. On the other hand, if it exceeds 150, the hardning of the film tends to be excessive, such being undesirable. To such a polymer, water-dispersibility and electrophoretic properties are imparted prior to or after or at the same time as the mixing with the aminoplast, by neutralizing at least a part of its carboxyl groups with a basic compound, as will be described hereinafter, and the water-dispersible and electrophoretic fluoropolymer thus obtained is used as component (a).

As the aminoplast for component (b), a melamine resin, a guanamine resin or a urea resin may be used. However, in the present invention, it is particularly preferred to employ a methylol melamine etherified at least partially with one or more lower alcohols such as methanol, ethanol, propanol and butanol, among various melamine resins.

The proportions of the fluoropolymer as component (a) and the aminoplast as component (b), are preferably such that component (a) is within a range of from 50 to 97 parts by weight, and component (b) is within a range of from 3 to 50 parts by weight. If component (a) is less than 50 parts by weight, it is difficult to impart the excellent properties of the fluoropolymer to the coating film. On the other hand, if the amount exceeds 97 parts by weight, the crosslinking of the coating film will be inadequate, whereby the properties of the coating film tend to be poor, such being undesirable.

The composition for electrodeposition paint of the present invention may be prepared, for instance, by the following method.

Firstly, a resin composition is formed as follows. Into a reactor equipped with a stirrer and a thermometer, a carboxyl and hydroxyl group-containing fluoropolymer as a starting material for component (a), an aminoplast as component (b) and an organic solvent are charged, and thoroughly stirred.

As the organic solvent, an alcohol such as methanol, ethanol, n-propanol, isopropanol, n-butanol, isobutanol, secondary butanol, tertiary butanol or pentanol, or a cellosolve such as methyl cellosolve, ethyl cellosolve, isopropyl cellosolve, butyl cellosolve or secondary butyl cellosolve, is used which is water-soluble and has an affinity with the resin in order to stabilize the electrodeposition paint composition with a low acid value.

The amount of the organic solvent in the composition for electrodeposition paint, is usually within a range of from 2.5 to 150% by weight, relative to the film-forming components. In the present invention, a basic compound is added to the resin composition prepared by the above-mentioned method to neutralize at least a part of carboxyl groups present in the molecule of the fluoropolymer and to make the polymer water-dispersible. Then, deionized water is added thereto for dilution to a suitable resin solid concentration to obtain a electrodeposition paint.

In the preparation of the composition for electrodeposition paint, the fluoropolymer may preliminarily be neutralized as mentioned above, and then the neutralized polymer may be mixed with the aminoplast.

The basic compound to be used in the present invention, may be any basic compound which is commonly employed. For instance, it includes ammonia; primary to tertiary alkylamines such as monomethylamine, dimethylamine, trimethylamine, monoethylamine, diethylamine, triethylamine, monoisopropylamine, diisopropylamine, triisopropylamine, monobutylamine, dibutylamine and tributylamine; alkanol amines such as monopethanolamine, diethanolamine, triethanolamine, monoisopropanolamine, diisopropanolamine, triisopropanolamine, dimethylaminoethanol and diethylaminoethanol; alkylene polyamines such as ethylenediamine, propylenediamine, diethylenetriamine and triethylenetetramine; alkylene imines such as ethyleneimine and propyleneimine; piperazine; morpholine; pyrazine; and pyridine.

The composition for electrodeposition paint of the present invention is used usually by adjusting its resin solid concentration to a level within a range of from 3 to 50% by weight. At that time, commonly employed pigment or paint additives may be incorporated.

In the composition for electrodeposition paint prepared as mentioned above, a direct current voltage is applied between an anode of a metal substrate and a cathode. Then, the metal substrate is withdrawn, and after washing or without washing, subjected to baking, whereupon a uniform electrodeposited fluoropolymer coating film with excellent gloss is formed on the surface of the metal substrate.

The composition for electrodeposition paint of the present invention has an advantage that the baking of the coating film can be achieved at a temperature of from 130° to 250° C., preferably from 140° to 230° C. for from 15 to 60 minutes.

If the gloss of the electrodeposited coating film is required to be adjusted, an inorganic or organic matting agent commonly employed, may be incorporated.

Now, the present invention will be described in further detail with reference to Examples. However, it should be understood that the present invention is by no means restricted to these specific Examples.

In the Examples, "parts" means "parts by weight" unless otherwise specified.

SYNTHESIS EXAMPLE 1 FOR THE PREPARATION OF A FLUOROPOLYMER STARTING MATERIAL

Into a stainless steel autoclave (pressure resistance: 50 kg/cm$^2$) having an internal capacity of 200 ml and equipped with a stirrer, 35 parts of chlorotrifluoro ethylene, 11 parts of cyclohexyl vinyl ether, 4.3 parts of ethyl vinyl ether, 15 parts of ω-hydroxybutyl vinyl ether, 98 parts of xylene, 28 parts of ethanol, 0.5 part of azobisisobutyronitrile and 1.5 part os potassium carbonate anhydride, were charged, and cooled with liquid nitrogen for freezing and degassing to remove dissolved air. Then, the reaction was conducted at 65° C. for 16 hours to obtain a hydroxyl group-containing fluoropolymer.

The polymer thus obtained had a specific viscosity of 0.11 dl/g as measured in tetrahydrofuran at 30° C.

A xylene solution containing about 60% of the hydroxyl group-containing fluoropolymer (OH value: about 120 mgKOH/g-resin) thus obtained, was heated to 90° C., and then 3.6 parts of succinic anhydride relative to 100 parts of the polymer, was added. Further, 0.2 part of triethylamine was added, and the reaction was conducted for 2 hours.

The infrared spectrum of the reaction solution was measured, whereby it was found that characteristic absorption of the acid anhydride (1850 cm$^{-1}$, 1780 cm$^{-1}$) observed prior to the reaction, disappeared after the reaction, and instead, absorptions attributable to a carboxylic acid (1710 cm$^{-1}$) and an ester (1735 cm$^{-1}$) were observed.

The fluoropolymer having the carboxyl groups thus introduced, has an acid value of 20 mgKOH/g-resin and a OH value of 100 mgKOH/g-resin.

The fluoropolymer thus obtained was subjected to evaporation of the solvent to isolate the polymer solid content, which was then dissolved afresh in isopropyl alcohol to obtain an isopropyl alcohol solution having a concentration of about 60%.

SYNTHESIS EXAMPLES 2 TO 10

In the same manner as in Synthesis Example 1, a monomer as identified in Table 1 was polymerized to obtain a xylene solution of a hydroxyl group-containing fluoropolymer.

Then, the polymer solution thus obtained was reacted with succinic anhydride in an amount as shown in Table 1 in the same manner as in Synthesis Example 1 to obtain a carboxyl and hydroxyl group-containing fluoropolymer.

The acid value and the OH value of each fluoropolymer thus obtained were as shown in Table 1.

An isopropanol solution of each fluoropolymer was prepared in the same manner as in Synthesis Example 1.

EXAMPLE 1

Into a reactor equipped with a stirrer, a thermometer and a reflux condenser, 135 parts of the fluoropolymer solution (No. 1) prepared in Synthesis Example 1 and 20 parts of a methyl ethyl mixed etherified methylol melamine (Cymel, tradename, manufactured by Mitsui Toatsu Chemicals, Inc.) were charged. While continuing the stirring, 4 parts of triethanolamine was added thereto, and then 26 parts of butyl cellosolve was added. Further, 150 parts of deionized water was added to obtain an electrodeposition paint concentrate.

EXAMPLES 2 to 6 and COMPARATIVE EXAMPLES 1 to 4

The respective electrodeposition paint concentrates were prepared in the same manner as in Example 1 except that instead of the fluoropolymer solution No. 1 in Example 1, solutions No. 2 to No. 10 were respectively used, and the amount of triethanol amine was changed to bring the neutralization degree to 0.93.

EXAMPLES 7 and 8 and COMPARATIVE EXAMPLES 5 and 6

The operation was conducted in the same manner as in Example 5 except that the proportions of the fluoropolymer solution and the methyl ethyl mixed etherified methylol malemine, were changed as shown in Table 2.

TABLE 2

|  | Examples | | Comparative Examples | |
|---|---|---|---|---|
|  | 7 | 8 | 5 | 6 |
| Fluoropolymer | 50 | 97 | 40 | 98.5 |
| Methyl ethyl mixed etherified methylol melamine | 50 | 3 | 60 | 1.5 |

To the electrodeposition paint concentrates obtained in the above Examples and Comparative Examples, deionized water was added to obtain the respective electrodeposition paints having a resin solid concentration of 10% by weight.

TABLE 1

| Synthesis | Within the present invention | | | | | | Outside the present invention | | | |
|---|---|---|---|---|---|---|---|---|---|---|
| Example No. | 1 | 2 | 3 | 4 | 5 | 6 | 7 | 8 | 9 | 10 |
| CTFE | 35 | 35 | 35 | 35 | 35 | 35 | 35 | 35 | 35 | 35 |
| CHVE | 11 | 11 | 11 | 11 | 11 | 11 | 11 | 11 | 11 | 7.6 |
| EVE | 4.3 | 8.3 | 4.3 | 14 | 11 | 4.3 | 14 | 11 | 4.3 | 0 |
| HBVE | 15 | 7.0 | 7.0 | 11 | 11 | 15 | 2.8 | 7.0 | 15 | 28 |
| Xylene | 98 | 98 | 98 | 98 | 98 | 98 | 98 | 98 | 98 | 98 |
| Ethanol | 28 | 28 | 28 | 28 | 28 | 28 | 28 | 28 | 28 | 28 |
| AIBN | 0.5 | 0.5 | 0.5 | 0.5 | 0.5 | 0.5 | 0.5 | 0.5 | 0.5 | 0.5 |
| $K_2CO_3$ | 1.5 | 1.5 | 1.5 | 1.5 | 1.5 | 1.5 | 1.5 | 1.5 | 1.5 | 1.5 |
| Succinic anhydride (relative to 100 parts of resin) | 3.6 | 1.3 | 2.9 | 2.9 | 4.5 | 1.8 | 1.8 | 0.5 | 9 | 3.6 |
| OH value (mgKOH/g-resin) | 100 | 45 | 36 | 64 | 55 | 110 | 11 | 49 | 70 | 170 |
| Acid value (mgKOH/g-resin) | 20 | 7 | 16 | 16 | 25 | 10 | 10 | 3 | 50 | 20 |

CTFE: Chlorotrifluoroethylene
CHVE: Cyclohexyl vinyl ether
EVE: Ethyl vinyl ether
HBVE: ω-Hydroxybutyl vinyl ether
AIBN: Azobisisobutyronitrile

TEST EXAMPLES

By using each electrodeposition paint prepared as above, an electrodeposition coating was applied to an alminum plate subjected to anodic oxidation, in accordance with the following method.

METHOD FOR THE ELECTRODEPOSITION COATING

An aluminum plate having an oxidized layer of 9 μm in thickness formed by anodic oxidation, was dipped in each electrodeposition paint and connected as an anode, and a stainless plate was provided as a counter electrode. Then, a direct current was applied at a voltage of 160 V for 3 minutes with a distance between the electrodes being 30 cm, at a polar ratio ±=2/1 at a liquid temperature of 20° C. Then, the aluminum plate was taken out, thoroughly washed with water, and then baked at 180° C. for 30 minutes to complete the electrodeposition coating. The properties of the coating film were tested. The results are shown in Table 3.

TABLE 3

| | Examples | | | | | | | |
|---|---|---|---|---|---|---|---|---|
| | 1 | 2 | 3 | 4 | 5 | 6 | 7 | 8 |
| Film thickness (μm) | 18 | 20 | 19 | 21 | 19 | 22 | 24 | 15 |
| Outer appearance of the coating film | Excellent | Excellent | Excellent | Excellent | Excellent | Excellent | Excellent | Excellent |
| Throwing power (1) | O | O | O | O | O | O | O | O |
| Gloss (2) | 105 | 103 | 101 | 100 | 108 | 100 | 102 | 90 |
| Pencil hardness (3) | 4H | 3H | 3H | 4H | 4H | 4H | 4H | 3H |
| Adhesion (4) | 100/100 | 100/100 | 100/100 | 100/100 | 100/100 | 100/100 | 100/100 | 100/100 |
| Result of Du-Pont impact test (5) | 50 cm | 50 cm | 50 cm | 50 cm | 50 cm | 50 cm | 50 cm | 50 cm |
| Acid resistance (6) | No change | No change | No change | No change | No change | No change | No change | No change |
| Alkali resistance (7) | No change | No change | No change | No change | No change | No change | No change | No change |
| Boiling water resistance (8) | No change | No change | No change | No change | No change | No change | No change | No change |
| Weather resistance | | | | | | | | |
| Sunshine weather-O-meter (9) | 70–80 | 70–80 | 70–80 | 70–80 | 70–80 | 70–80 | 50–60 | 90 or more |
| Dewcycle weather-O-meter (10) | 65–70 | 65–70 | 65–70 | 65–70 | 65–70 | 65–70 | 55–60 | 80 or more |
| Solvent resistance (11) | No change after 100 times | No change after 100 times | No change after 100 times | No change after 100 times | No change after 100 times | No change after 100 times | No change after 100 times | No change after 100 times |
| Solution stability (12) | No change | No change | No change | No change | No change | No change | No change | No change |
| Synthesis Example No. for the fluoropolymer used | 1 | 2 | 3 | 4 | 5 | 6 | 5 | 5 |

| | Comparative Examples | | | | | | |
|---|---|---|---|---|---|---|---|
| | 1 | 2 | 3 | 4 | 5 | 6 | 7 |
| Film thickness (μm) | 16 | — | 8 | 20 | 25 | 12 | 20 |
| Outer appearance of the coating film | Excellent | — | Excellent | Excellent | Excellent | Excellent | Excellent |
| Throwing power (1) | O | — | O | O | O | O | O |
| Gloss (2) | 103 | — | 80 | 78 | 100 | 88 | 103 |
| Pencil hardness (3) | 2H | — | 4H | 5H | 4H | 3H | 4H |
| Adhesion (4) | 100/100 | — | 100/100 | 90/100 | 100/100 | 100/100 | 100/100 |
| Result of Du-Pont impact test (5) | 50 cm | — | 50 cm | 35 cm | 50 cm | 50 cm | 50 cm |
| Acid resistance (6) | No change | — | Blister appeared 6 days later | Blister appeared 6 days later | No change | No change | No change |
| Alkali resistance (7) | No change | — | Blister appeared 6 days later | Blister appeared 6 days later | No change | No change | No change |
| Boiling water resistance (8) | No change | — | Film turned milky white | No change | No change | No change | Gloss degraded |
| Weather resistance | | | | | | | |
| Sunshine weather-O-meter (9) | 70–80 | — | 70–80 | 70–80 | 50 or less | 90 or more | 10 or less |
| Dewcycle weather-O-meter (10) | 65–70 | — | 65–70 | 65–70 | 50 or less | 80 or more | 10 or less |
| Solvent resistance (11) | Dissolved in 20 times | — | No change after 100 times | No change after 100 times | No change after 100 times | 50 times | 50 times |
| Solution stability (12) | No change | Impossible to form an aqueous solution | No change | No change | No change | No change | No change |
| Synthesis Example No. for the | 7 | 8 | 9 | 10 | 5 | 5 | *— |

TABLE 3-continued fluoropolymer used

Notes:
(1) The throwing power was evaluated by the difference in thickness of the front and back coating films of the aluminum plate.
O: from 0 to less than 2 μm
Δ: from 2 μm to less than 3 μm
X: 3 μm or more
(2) The gloss is indicated by the specular reflectance at 60°.
(3), (4) and (8) were tested in accordance with JIS (Japanese Industrial Standards) H 8602.
(5) By a Du-Pont impact tester, a ball having a weight of 1 kg and a diameter of a ½ inch was dropped, and the maximum height where no change was observed to the coating film was indicated (provided that the maximum height was 50 cm).
(6) The test sample was dipped in a 5% sulfuric acid solution for 7 days, whereupon the change to the coating film was visually evaluated.
(7) The test sample was dipped in a 5% sodium hydroxide solution for 7 days, whereupon the change to the coating film was visually evaluated.
(9) The gloss retention rate of the coating film after exposure for 4,000 hours.
(10) The gloss retention rate of the coating film after exposure for 300 hours.
(11) The film surface was wiped with a xylene-impregnated cotton cloth, and the number of times of the wiping operation where the coating film underwent a change, was indicated.
(12) The electrodeposition paint was left to stand still at 30° C. for one month, whereupon the change was visually evaluated.

Comparative Example 7 represents the results obtained by using a commercially available acryl-melamine-type anionic electrodeposition paint.

As is evident from the foregoing, the compositions for electrodeposition paint of the present invention have excellent solution stability, and the coating layers thereby obtained exhibit excellent outer appearance and have excellent properties such as excellent weather resistance, alkali resistance, boiling water resistance and adhesion.

We claim:

1. A composition for electrodeposition paint, comprising (a) a water-dispersible and electrophoretic fluoropolymer obtained by neutralizing with a basic compound at least a part of the carboxyl groups of a carboxyl and hydroxyl group-containing fluoropolymer having an acid value of from 5 to 30 and a OH value of from 30 to 150 and (b) an aminoplast, which are dispersed in an aqueous medium in a weight ratio of component (a)/component (b) of from 50/50 to 97/3, wherein the aminoplast is a melamine resin, a guanamine resin or a urea resin.

2. The composition according to claim 1, wherein the carboxyl and hydroxyl group-containing fluoropolymer is the one with carboxyl groups introduced by reacting a dibasic acid anhydride with a hydroxyl group-containing fluoropolymer.

3. The composition according to claim 1, wherein the aminoplast is a melamine resin etherified at least partially with a lower alcohol.

* * * * *